United States Patent
Mao et al.

(10) Patent No.: US 10,202,879 B2
(45) Date of Patent: Feb. 12, 2019

(54) REDUCED ORDER SELECTIVE CATALYTIC REDUCTION

(71) Applicant: GM Global Technology Operations LLC, Detroit, MI (US)

(72) Inventors: Fuhe Mao, Oakland Township, MI (US); Yue-Yun Wang, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/467,259

(22) Filed: Mar. 23, 2017

(65) Prior Publication Data

US 2018/0274417 A1   Sep. 27, 2018

(51) Int. Cl.
  *F01N 3/00*   (2006.01)
  *F01N 3/20*   (2006.01)
  *F01N 9/00*   (2006.01)

(52) U.S. Cl.
  CPC .............. *F01N 3/208* (2013.01); *F01N 9/005* (2013.01); *F01N 2610/00* (2013.01)

(58) Field of Classification Search
  USPC ......... 60/274, 276, 286, 295, 297, 301, 303; 701/103, 109, 114
  See application file for complete search history.

(56) References Cited

U.S. PATENT DOCUMENTS

| | | | | |
|---|---|---|---|---|
| 7,997,070 B2* | 8/2011 | Yasui | ...................... | F01N 3/208 60/276 |
| 8,281,572 B2* | 10/2012 | Chi | ........................ | F01N 3/106 60/286 |
| 9,238,984 B2* | 1/2016 | Chavannavar | .......... | F01N 3/208 |
| 2012/0096837 A1* | 4/2012 | Yacoub | .................. | F01N 3/208 60/274 |

* cited by examiner

*Primary Examiner* — Binh Q Tran
(74) *Attorney, Agent, or Firm* — Cantor Colburn LLP (57) ABSTRACT

Technical features are described for an emissions control system for a motor vehicle that includes an internal combustion engine are described. The emissions control system includes a selective catalytic reduction (SCR) device fluidically including an SCR inlet and an SCR outlet. The emissions control system further includes a controller that computes a correction factor for a kinetics model of the SCR device based on an amount of NO and an amount of NOx in the emissions control system. The controller further predicts an amount of NOx output by the SCR device using the kinetics model and the correction factor. The controller further inputs an amount of catalyst into the SCR device based on the predicted amount of NOx. The correction factor is a ratio of the amount of NO and the amount of NOx at the SCR inlet.

17 Claims, 7 Drawing Sheets

REDUCED ORDER SELECTIVE CATALYTIC REDUCTION

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an after treatment system to convert certain, or all of these exhaust constituents into non-regulated exhaust gas components.

Exhaust gas treatment systems typically include Selective Catalyst Reduction ("SCR") devices. The SCR device includes a substrate having a washcoat disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. However, if the reduction reaction rate is too slow, or if there is excess ammonia in the exhaust, ammonia can slip from the SCR device. On the other hand, if there is too little ammonia in the exhaust, SCR NOx conversion efficiency will be decreased.

SUMMARY

In one or more examples, an emissions control system for a motor vehicle that includes an internal combustion engine are described. The emissions control system includes a selective catalytic reduction (SCR) device fluidically including an SCR inlet and an SCR outlet. The emissions control system further includes a controller that computes a correction factor for a kinetics model of the SCR device based on an amount of NO and an amount of NOx in the emissions control system. The controller further predicts an amount of NOx output by the SCR device using the kinetics model and the correction factor. The controller further inputs an amount of catalyst into the SCR device based on the predicted amount of NOx. The correction factor is a ratio of the amount of NO and the amount of NOx at the SCR inlet.

Further, the controller predicts the amount of NOx output based on a temperature of a wall of a substrate in the SCR device. The controller determines the temperature of the wall of the substrate based on a temperature of exhaust gas in the SCR device. The controller determines the temperature of the wall of the substrate based on a difference in a temperature at the SCR inlet and the temperature of the exhaust gas. Alternatively, or in addition, the controller determines the temperature of the wall of the substrate based on a difference in a temperature at the SCR outlet and the temperature of the exhaust gas.

Further, the SCR device further includes a first-can and a second-can, the kinetics model being a first kinetics model, and wherein the first-can operates according to the first kinetics model, and the second-can operates according to a second kinetics model, and only the first kinetics model is applied the correction factor.

One or more examples, describes an exhaust system for an internal combustion engine, configured to perform a selective catalytic reduction (SCR) of exhaust gas. The exhaust system includes a controller that computes a correction factor for a kinetics model of an SCR device of the exhaust system, the correction factor computed based on an amount of NO and an amount of NOx in the exhaust gas. The controller further predicts an amount of NOx output by the SCR device using the kinetics model and the correction factor. The controller further inputs an amount of catalyst into the SCR device based on the predicted amount of NOx. In one or more examples, the correction factor is a ratio of the amount of NO and the amount of NOx at an inlet of the SCR device. The controller predicts the amount of NOx output based on a temperature of a wall of a SCR substrate of the SCR device. The controller determines the temperature of the wall of the SCR substrate based on a temperature of exhaust gas in the SCR device. Alternatively, or in addition, the controller determines the temperature of the wall of the SCR substrate based on a difference in a temperature at the SCR inlet and the temperature of the exhaust gas. Alternatively, or in addition, the controller determines the temperature of the wall of the SCR substrate based on a difference in a temperature at the SCR outlet and the temperature of the exhaust gas.

Alternatively, or in addition, the SCR device includes a first-can and a second-can, the kinetics model being a first kinetics model, and wherein the first-can operates according to the first kinetics model, and the second-can operates according to a second kinetics model, and only the first kinetics model is applied the correction factor.

One or more examples describe an apparatus that controls a selective catalytic reduction (SCR) device of an exhaust system of an internal combustion engine. The apparatus includes a controller that computes a correction factor for a kinetics model of the SCR device of the exhaust system, the correction factor computed based on an amount of NO and an amount of NOx in exhaust gas. The controller further predicts an amount of NOx output by the SCR device using the kinetics model and the correction factor. The controller further inputs an amount of catalyst into the SCR device based on the predicted amount of NOx. In one or more examples, the correction factor is a ratio of the amount of NO and the amount of NOx at an inlet of the SCR device.

In one or more examples, the controller predicts the amount of NOx output based on a temperature of a wall of a SCR substrate of the SCR device. Further, the controller determines the temperature of the wall of the SCR substrate based on a difference in a temperature at the SCR inlet and the temperature of the exhaust gas. Alternatively, or in addition, the controller determines the temperature of the wall of the SCR substrate based on a difference in a temperature at the SCR outlet and the temperature of the exhaust gas.

Further, the SCR device includes a first-can and a second-can, the kinetics model being a first kinetics model, and wherein the first-can operates according to the first kinetics model, and the second-can operates according to a second kinetics model, and only the first kinetics model is applied the correction factor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Figure 1:
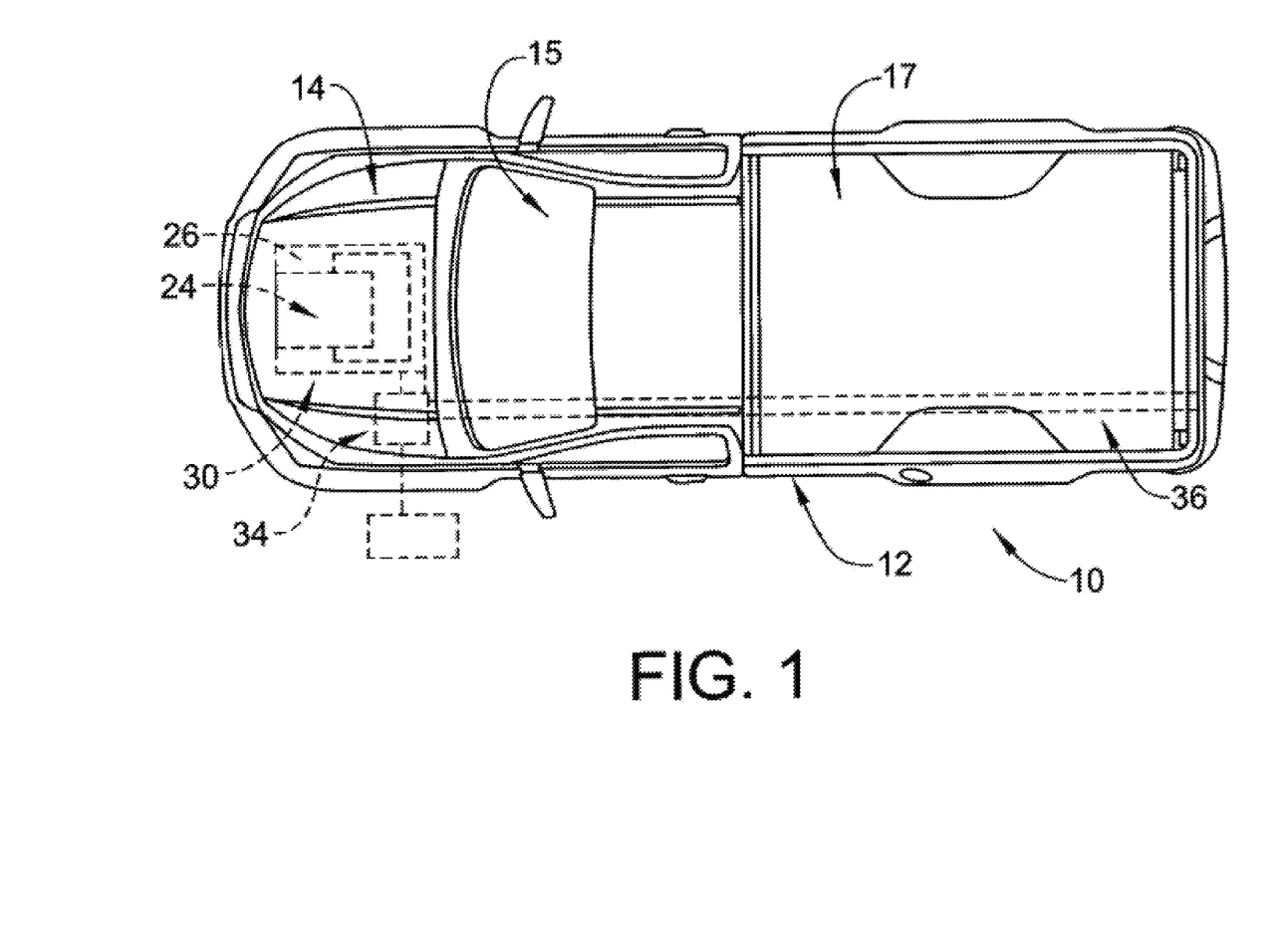
FIG. 1 depicts a motor vehicle including an internal combustion engine and an emission control system according to one or more embodiments.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 26. Internal combustion engine system 24 includes an exhaust system 30 that is fluidically connected to an aftertreatment or emissions control system 34. Exhaust produced by internal combustion engine system 24 passes through emissions control system 34 to reduce emissions that may exit to ambient through an exhaust outlet pipe 36.

Figure 2:
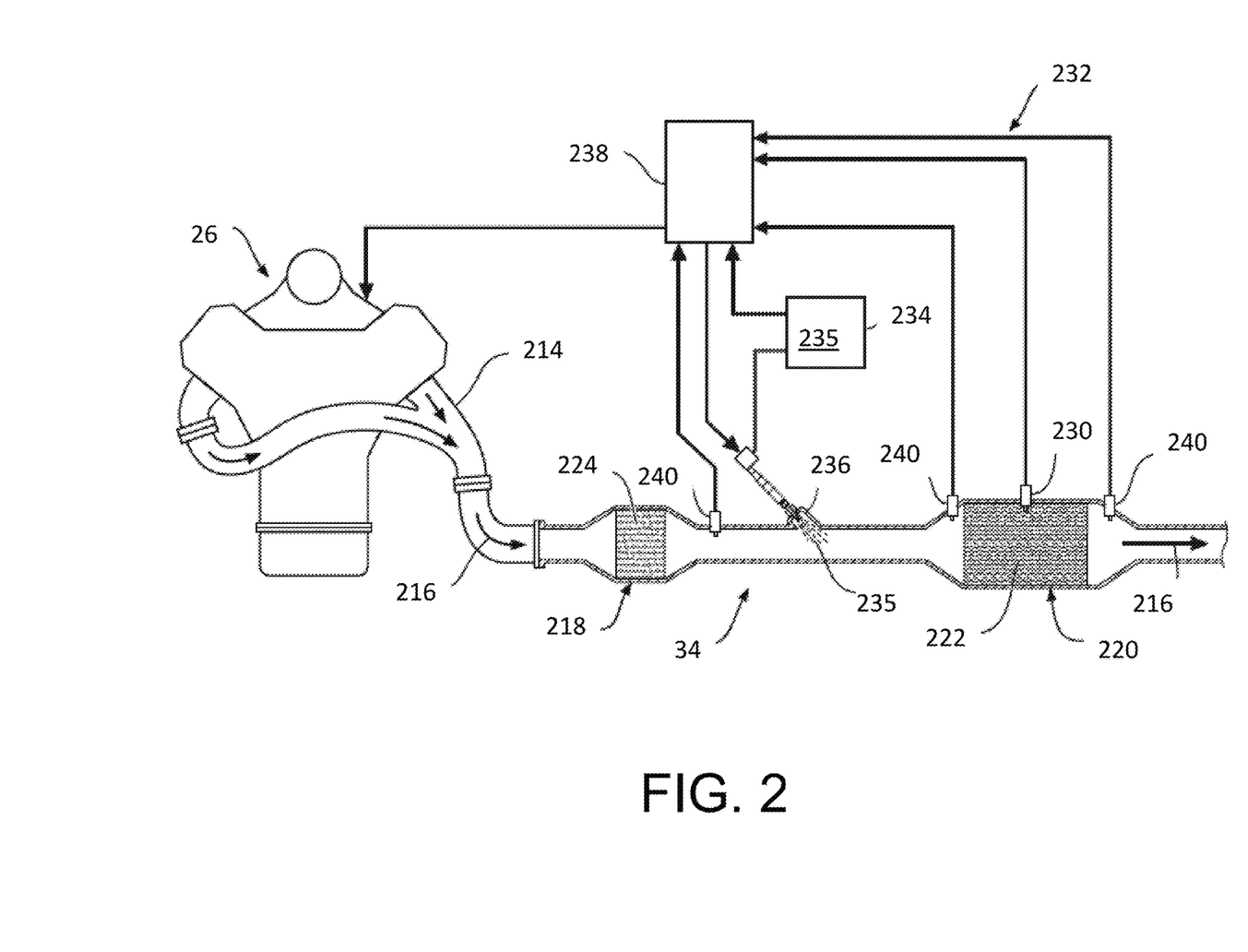
FIG. 2 is a block diagram depicting the emission control system, according to one or more embodiments.

FIG. 2 illustrates example components of the emissions control system 34 according to one or more embodiments. It should be noted that while the internal combustions engine system 24 includes a diesel engine 26 in the above example, the emissions control system 34 described herein can be implemented in various engine systems. Such engine systems may include, for example, but are not limited to diesel engine systems and gasoline engine systems The emissions control system 34 generally includes one or more exhaust gas conduits 214, and one or more exhaust treatment devices. The exhaust treatment devices include, but are not limited to, an oxidation catalyst device ("OC") 218, and a selective catalytic reduction filter (SCRF) 220.

The exhaust gas conduit 214, which may comprise several segments, transports exhaust gas 216 from the engine 26 to the various exhaust treatment devices 218, 220 of the emissions control system 34. As can be appreciated, the OC 218 can be of various flow-through, oxidation catalyst devices known in the art. In various embodiments the OC 218 may include a flow-through metal or ceramic monolith substrate 224 that is wrapped in an intumescent matte or other suitable support that expands when heated, securing and insulating the substrate. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. The catalyst compositions for the SCR function and NH3 oxidation function can reside in discrete washcoat layers on the substrate or, alternatively, the compositions for the SCR and NH3 oxidation functions can reside in discrete longitudinal zones on the substrate.

The SCRF 220 may be disposed downstream from the OC 218. The SCRF 220 includes a filter portion 222 that is configured to remove carbon and other particulate matter from the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate; which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

The catalyst containing washcoat disposed on the filter portion 222 is configured to reduce NOx constituents in the exhaust gas 216. The SCRF 220 may utilize a reductant, such as ammonia (NH3), to reduce the NOx. The catalyst containing washcoat may contain a zeolite and one or more base metal components such as iron (Fe), cobalt (Co), copper (Cu), or vanadium (V) which can operate efficiently to convert NOx constituents of the exhaust gas 216 in the presence of NH3. The reductant NH3 utilized by the SCRF 220 may be generated from a material in the form of a solid, a gas, a liquid, or an aqueous urea solution and may be mixed with air to aid in the dispersion of an injected spray generated by a reductant delivery system.

The emissions control system 34 may further include at least one pressure sensor 230 (e.g., a delta pressure sensor).

The delta pressure sensor 230 may determine the pressure differential (i.e., Δp) across the SCRF 220. Although a single delta pressure sensor 230 is illustrated, it is appreciated that a plurality of pressure sensors may be used to determine the pressure differential of the SCRF 220. For example, a first pressure sensor may be disposed at the inlet of the SCRF 220 and a second pressure sensor may be disposed at the outlet of the SCRF 220. Accordingly, the difference between the pressure detected by the second delta pressure sensor and the pressure detected by the first delta pressure sensor may indicate the pressure differential across the SCRF 220.

The emissions control system 34 further includes a reductant delivery system 232 that introduces a reductant to the exhaust gas 216. The reductant delivery system 232 includes a reductant supply 234, an injector 236, and a control module 238. The reductant supply 234 stores a reductant 235 and is in fluid communication with the injector 236. The reductant 235 may include, but is not limited to, NH3. Accordingly, the injector 236 may inject a selectable amount of reductant 235 into the exhaust gas conduit 214 such that the reductant 235 is introduced to the exhaust gas 216 at a location upstream of the SCRF 220.

The control module 238 may control the engine 26, the reductant delivery system 232 and the regeneration process based on sensed data provided by sensors and/or modeled data stored in memory. In various embodiments, the control module 238 further diagnoses one or more sub-systems and/or devices of the emissions control system 34 based on one or more sensed and/or modeled inputs based on the diagnostic methods and systems of the present disclosure. In one example, the control module 238 is in electrical communication with a plurality of temperatures sensors 240. A first temperature sensor 240 may disposed at the outlet of the OC 218, a second temperature sensor 240 is disposed upstream from the SCRF 220 and a third temperature sensor 240 is disposed downstream from the SCRF 220. It should be noted that additional temperature sensors 240 may be used to monitor a catalyst temperature, such as OC and SCRF catalyst temperatures and/or other components of the emissions control system 34. In one or more examples, a catalyst temperature may be monitored by monitoring the temperature of the exhaust of the OC 218. The temperature sensors 240 sense the temperature of corresponding components, or predetermined thermal area in the emissions control system 34, and generate a corresponding temperature signal based thereon. For example the temperature sensors 240 may output a temperature signal indicating an SCRF temperature of the SCRF 220, a catalyst temperature and the like.

Alternatively, or in addition, the control module 238 receives the temperature signals from the one or more temperature sensors 240 and determines absolute temperatures of the one or more components and/or thermal areas of the emissions control system 34, such as the SCRF 220 (i.e., the SCRF temperature) for example.

The control module 238 controls operation of the injector 236 according to a reductant storage model. A reductant storage module may be utilized to determine an amount of reductant 235 to be stored on the SCRF 220. The control module 238 may determine a correction coefficient corresponding to the reductant storage model based on the temperature gradient of the SCRF 220, and may more precisely control the amount of injected reductant provided by the injector 236. Accordingly, the supply of reductant 35 may be utilized more efficiently.

The SCRF 220 may be a single-can SCR device or a multi-can SCR device, such as a two-can SCR device. The SCRF 220 facilitates the NOx reduction reaction as the gases pass through the catalyst substrate. Before entering the catalyst substrate the ammonia, or other reductant (such as urea), is injected and mixed with the exhaust gases. In one or more examples, the SCRF 220 includes a NOx adsorber or NOx trap, also called Lean NOx trap (LNT), which is a device that reduces the $NO_x$. Alternatively, or in addition, part or all of the incoming $NH_3$ gases are adsorbed by the surface walls of the SCRF 220, and a portion of the $NH_3$ gases may escape because of desorption.

Figure 3:
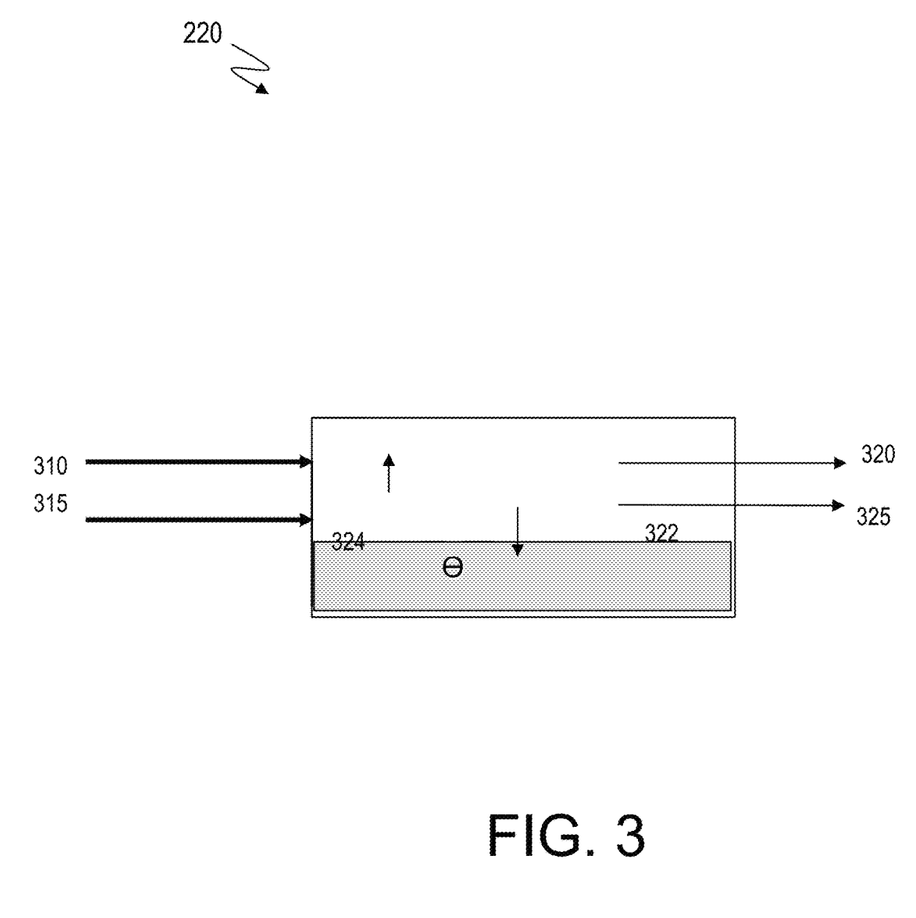
FIG. 3 is a block diagram depicting a SCR device, according to one or more embodiments.

FIG. 3 illustrates an example flow of the exhaust gases 216 through the SCRF 220, according to one or more embodiments. The control module 238 measures the flow rate (F) of exhaust gas 216, and concentration C of the gas. For example, the SCRF 220 determines an input flow-rate of NOx 310 as $FC_{NOx,in}$, where F is the volume of the incoming gas 216, and $C_{NOx,in}$ is the inlet concentration of NOx in the incoming gas 216. Similarly, $FC_{NH3,in}$ is the volume of the flow-rate of $NH_3$ 315 in the incoming gas 216, $C_{NH3,in}$ being the inlet concentration of $NH_3$. Further, compensating for the amount of adsorption 322 and amount of desorption 324, and the amounts reacted on the catalyst surface, the control module 238 may determine $C_{NH3}$ as the SCR concentration of $NH_3$, and $C_{NOx}$ as SCR concentration of $NO_x$.

Accordingly, $FC_{NOx}$ is the $NO_x$ outlet volume flow rate 320 of $NO_x$ through the outlet of the SCRF 220. In one or more examples, the control module 238 may determine $W_{NOx}FC_{NOx}$ as mass flow rate of $NO_x$, where $W_{NOx}$ is the molecular weight of $NO_x$. Similarly, for $NH_3$, the outlet volume flow rate 325 is $FC_{NH3}$ with the mass flow rate of $NH_3$ being $W_{NH3}FC_{NH3}$.

The SCRF 220 has to precisely control the reductant injection rate, such as ammonia producing urea aqueous solution injection rate. An insufficient injection may result in unacceptably low NOx conversion. An injection rate which is too high results in release of ammonia to the atmosphere. These ammonia emissions from SCR systems are known as ammonia slip. The ammonia slip increases at a ratio, which is higher than the designed optimal NH3/NOx ratios.

The technical features described herein facilitate the control module 238 to compute an estimated concentration of $NH_3$ downstream from the SCRF 220, thus facilitating the control module 238 to inject the appropriate amount of ammonia to reduce such ammonia slip. The technical features herein improve the operation of the SCRF 220 by facilitating the control module 238 to use the temperature signals to modify an SCR kinetics model used by the SCRF 220 to predict the $NH_3$ concentration. For example, the technical features herein couple the SCR kinetics model with the washcoat temperature signals (which may also be referred to as catalyst temperature signals).

Alternatively, or in addition, the technical features herein improve the operation of the SCRF 220 by coupling the SCR kinetics model with a correction factor, computed as an R-ratio, which is a ratio of NO/NOx. In one or more examples, the ratio is computed based on the concentrations of NO and NOx at the inlet of the SCRF 220. Alternatively, or in addition, the ratio is computed at the outlet of the SCRF 220. The R-ratio is indicative of a concentration of NO among other nitrogen oxides in the gas 216.

The concentration of NO may be affected by the concentration of NH3 that is released, or delivered at the inlet, and also by the operating temperatures of the exhaust gas 216, and/or within the SCRF 220. For example, upon raising the ammonia inlet concentration, NO conversion increases, more significantly for temperatures between 180 and 340° C. In contrast, at higher temperatures, rate of reaction begins to decrease and conversion is less affected by raising the NH3 concentration. Thus, the R-ratio may be a function of the exhaust gas temperature. Accordingly, the control module 238 may determine the R-ratio correction factor based on an input from the temperature sensors 440, specifically providing the exhaust gas temperature (T_gas). For example, the control module 238 may use a predetermined computation to determine the R-ratio based on the T_gas. Alternatively, or in addition, the control module 238 accesses a look-up table to the R-ratio corresponding to the T_gas.

Further yet, in one or more examples, the R-ratio is a predetermined constant.

By modifying the SCR model with the washcoat temperature and the R-ratio, the technical features herein improve prediction of the SCR catalyst outputs. Further, the improved SCR model using such features improve the computation-speed for the control module 238, thus facilitating substantially real-time and close-loop control of the SCR SCRF 220. Thus, the technical features described herein facilitate an improved SCR model that can be used in an SCR based emissions control system, such as a diesel after-treatment SCR system, to reduce computing time, and in turn to improve the SCR conversion efficiency and reduce $NH_3$ slip.

For example, the control module 238 computes estimated values of concentration of $NO_x$ ($\dot{C}NO_x$) and the concentration of $NH_3$ ($\dot{C}NH_3$) along with ammonia coverage ratio ($\theta$) according to a reduced order SCR kinetics model, such as a $3^{rd}$ degree model below. The kinetics model estimates the values downstream from the SCRF 220. The kinetics model below applies the R-Ratio correction factor described herein.

$$\begin{cases} \dot{C}_{NOx} = \frac{1}{V}(FC_{NOx,in} - FC_{NOx} - \\ \quad r_{RED\text{-}ST}R\Theta\theta C_{NOx} - r_{RED\text{-}FAST}R(1-R)C_{NOx}^2 \Theta\theta) \\ \dot{\theta} = r_{ADS}C_{NH_3}(1-\theta) - r_{DES}\theta - \\ \quad r_{RED\text{-}ST}RC_{NOx}\theta - r_{RED\text{-}FAST}R(1-R)C_{NOx}^2\theta - r_{OXY}\theta \\ \dot{C}_{NH_3} = \frac{1}{V}(FC_{NH3,in} - FC_{NH3} - r_{ADS}\Theta C_{NH_3}(1-\theta) + r_{DES}\Theta\theta) \\ R = NO/NOx \end{cases}$$

In the above model,
$\Theta \Rightarrow$ (Ammonia Storage Capacity)
$\theta \Rightarrow$ (Ammonia Coverage Ratio)
$\dot{C}_i \Rightarrow$ (Specie Concentration)
$F \Rightarrow$ (Exhaust Flow)
$T = T_W \Rightarrow$ (Catalyst Temperature)

It should be noted that the temperature T in the above model may be measured at various points in the emissions control system. For example, the exhaust gas temperature, the ambient temperature, inlet temperature, outlet temperature, and so on. The technical features herein use one or more of the temperature measurements to compute an estimated temperature of the wall of the SCRF 220, referred herein as T_wall. In one or more examples, the temperature sensors 240 may include a temperature sensor that monitors the temperature of the wall, which is used directly.

Further, the model uses the one or more rates ($r_i$), which are each a function of the temperature T. The rates and their computations as a function of temperature are as follows.

$$r_{ADS}(T) = K_{ADS}e^{\left(-\frac{E_{ADS}}{RT}\right)} \Rightarrow \text{(Adsorption Rate)}$$

$$r_{DES}(T) = K_{DES}e^{\left(-\frac{E_{DES}}{RT}\right)} \Rightarrow \text{(Desorption Rate)}$$

$$r_{RED\text{-}ST}(T) = K_{RED\text{-}ST}e^{\left(-\frac{E_{RED\text{-}ST}}{RT}\right)} \Rightarrow \text{(Standard } NO_x \text{ Reduction Rate)}$$

$$r_{RED\text{-}FAST}(T) = K_{RED\text{-}FAST}e^{\left(-\frac{E_{RED\text{-}FAST}}{RT}\right)} \Rightarrow \text{(Fast } NO_x \text{ Reduction Rate)}$$

$$r_{OXY}(T) = K_{OXY}e^{\left(-\frac{E_{OXY}}{RT}\right)} \Rightarrow \text{(NH}_3 \text{ Oxydation Rate)}$$

Here, $K_i$ are predetermined constants, which may be configurable for each rate. $E_i$ is an activation energy for the corresponding reaction (adsorption, desorption, and NOx conversion etc.). Both the $K_i$ and $E_i$ are determined based on the SCRF catalyst formulation. R used in the exponential terms above is the ideal gas flow constant (and not the R-ratio correction factor described earlier).

The above SCR kinetic model can also be expressed as follows, by combining the $r_{RED\text{-}ST}$ and $r_{RED\text{-}FAST}$ into $r_{red}$.

$$\begin{cases} \dot{C}_{NOx} = \frac{1}{V}(FC_{NOx,in} - FC_{NOx} - r_{RED}(T,R)\Theta\theta C_{NOx}) \\ \dot{\theta} = r_{ADS}C_{NH_3}(1-\theta) - r_{DES}\theta - r_{RED}(T,R)C_{NOx}\theta - r_{OXY}\theta \\ \dot{C}_{NH_3} = \frac{1}{V}(FC_{NH3,in} - FC_{NH3} - r_{ADS}\Theta C_{NH_3}(1-\theta) + r_{DES}\Theta\theta) \\ R = NO/NOx \end{cases}$$

Further, the $3^{rd}$ degree order kinetic model can be reduced to a $1^{st}$ order kinetic model by setting $\dot{C}_{NOx}=0$, and $\dot{C}_{NH3}=0$. Thus, $$\begin{cases} 0 = \frac{1}{V}(FC_{NOx,in} - FC_{NOx} - r_{RED}(T,R)\Theta\theta C_{NOx}) \\ \dot{\theta} = r_{ADS}C_{NH_3}(1-\theta) - r_{DES}\theta - r_{RED}(T,R)C_{NOx}\theta - r_{OXY}\theta \\ 0 = \frac{1}{V}(FC_{NH3,in} - FC_{NH3} - r_{ADS}\Theta C_{NH_3}(1-\theta) + r_{DES}\Theta\theta) \\ R = NO/NOx \end{cases}$$

It should be noted that the SCR kinetics model is a closed-loop system in which the estimated $NO_x$ concentration downstream $\dot{C}_{NOx}$ and the estimated $NH_3$ concentration downstream $\dot{C}_{NH3}$ are subjected to a time delay and filtered using a low-pass filter in order to adapt the concentration determined in the kinetic model to the actual conditions in the exhaust system. The delay thus takes into consideration the transport delay to a sensor position (not shown) downstream, and the low-pass filtering takes into consideration the time constant of the sensor. The time-delayed and low-pass-filtered estimated NOx concentration downstream is output by the kinetic model.

Figure 4:
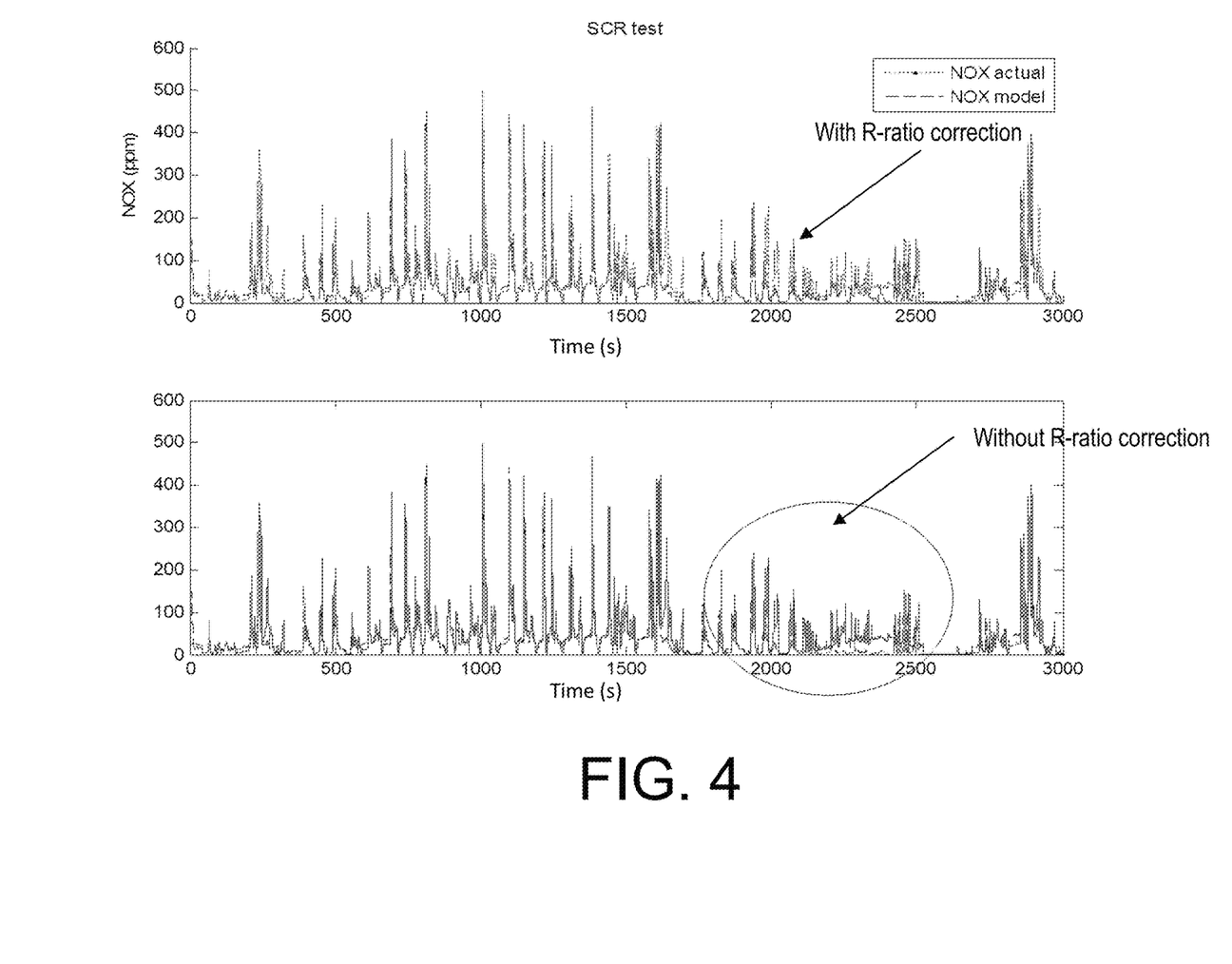
FIG. 4 illustrates an example improvement in estimated NOx concentration values of an emissions control system, according to one or more embodiments.

The control module 238, by using the R-ratio correction factor improves the accuracy of the SCR kinetics model. The estimated downstream NOx concentration with the model is within a predetermined threshold of the actual NOx concentration that is measured by a NOx sensor. In one or more examples, in response to a difference between the estimated NOx concentration and the actual measured NOx concentration being above the predetermined threshold, the control module 238 may cause the vehicle to provide an error signal, such as a check-engine light, or any other audio-visual error signal. FIG. 4 illustrates an example improvement in the estimated NOx concentration values by the control module 238 when the R-ratio correction factor is taken into account. It should be noted that the improvement shown in FIG. 4 is illustrative, and that in other examples, the improvement may be different, and or output may be different.

Further, the control module 238 couples the kinetics model with a catalyst temperature thermal model to further improve the model accuracy based on the SCR NOx conversion efficiency being dependent on the catalyst wall temperature, other than the gas phase temperature.

Figure 5:
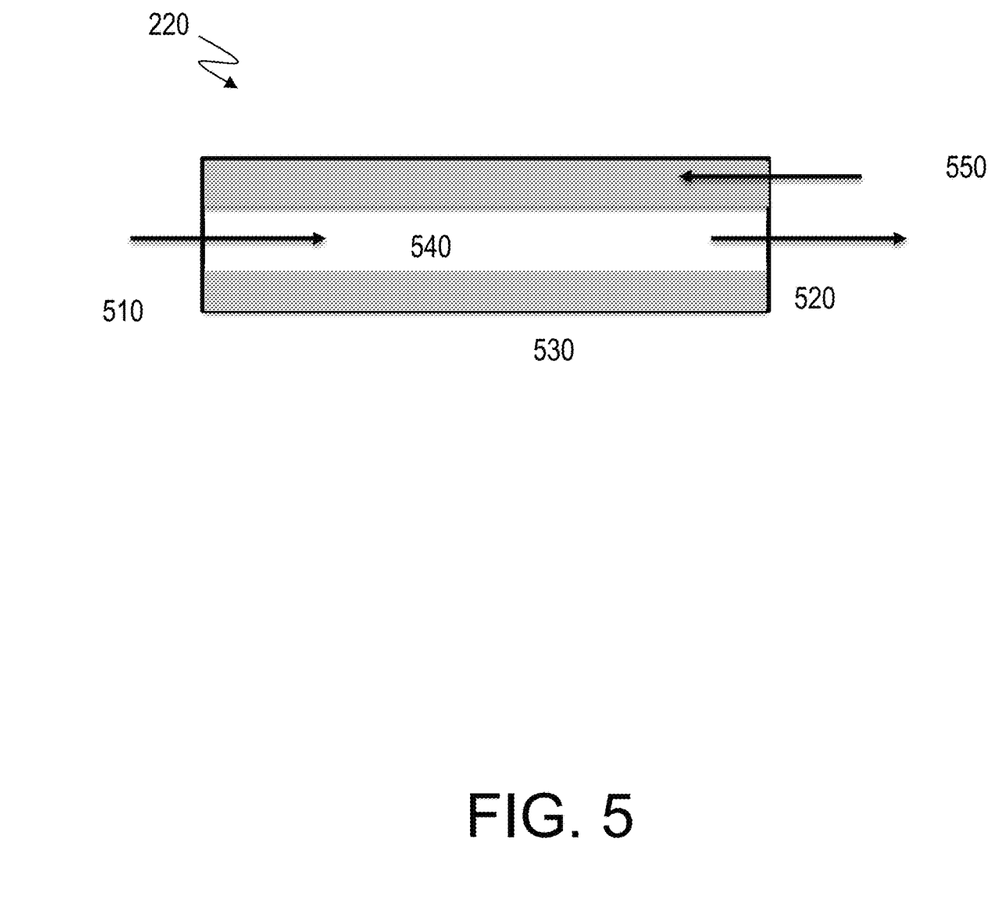
FIG. 5 illustrates example temperature measurements and computations used for coupling a temperature model with a SCR kinetics model, according to one or more embodiments.

FIG. 5 illustrates example temperature measurements and computations that the control module 238 uses for coupling a temperature model with the kinetics model, according to one or more embodiments. The temperature sensors 240 are used to measure the temperature of the exhaust gas 216 at the inlet (T_in) 510 as well as the outlet (T_out) 520 of the SCRF 220. In one or more examples, the temperature of the exhaust gas 216 inside the SCRF is computed based on the inlet and the outlet temperatures as T_gas 540, where T_gas=(T_in+T_out)/2. Further, one of the temperature sensors 240 measures the ambient temperature T_amb 530.

The control module 238 uses the above values to determine a temperature of the wall of the SCRF 220, referred to as the wall temperature T_wall 550. In one or more examples, the T_wall 550 is computed based on a temperature model such as the following, where h is heat transfer coefficient, is heat transfer across section area of the SCRF 220.

$$m\frac{dT_{wall}}{dt} = hS(T_{gas} - T_{wall}) + h_0S_0(T_{amb} - T_{wall}) + c \cdot f_{dead\_zone}(T_{in} - T_{out})$$

Alternatively, T_wall 550 is computed using the model $$m\frac{dT_{wall}}{dt} = hS(T_{gas} - T_{wall}) + h_0S_0(T_{amb} - T_{wall}) + c \cdot f_{dead\_zone}(T_{gas} - T_{out})$$

In yet another example, T_wall 550 is computed using the model $$m\frac{dT_{wall}}{dt} = hS(T_{gas} - T_{wall}) + h_0S_0(T_{amb} - T_{wall}) + c \cdot f_{dead\_zone}(T_{in} - T_{gas})$$

Further, in another example T_wall 550 is computed using the model $$m\frac{dT_{wall}}{dt} = hS(T_{gas} - T_{wall}) + h_0S_0(T_{amb} - T_{wall}) + f_{dead\_zone}\left(\frac{1}{\tau s+1}\frac{dT_{gas}}{dt}\right)$$

In yet another example, T_wall 550 is computed using the model $$m\frac{dT_{w0}}{dt} = hS(T_{gas} - T_{w0}) + h_0S_0(T_{amb} - T_{w0})$$

$$T_{wall} = T_{w0} + c \cdot f_{dead\_zone}(T_{gas} - T_{out})$$

where $T_{w0}$ is a state variable used to compute T_wall.

In the above models, the $f_{dead\ zone}$ is a filter, such as a band-pass filter, that eliminates temperature values corresponding to steady states. For example, if the input to the filter $f_{dead\ zone}$ is within a predetermined range that is to be filtered, the filter outputs, resulting in T_wall=$T_{w0}$. If the input is outside the filter range, the filter $f_{dead\ zone}$ scales the input according to a scaling factor c. Further, c is a configurable value, for example. The T_wall facilitates the control module 238 to emulate a temperature gradient change along the SCRF 220 axis to improve the accuracy of the kinetics model.

Figure 6:
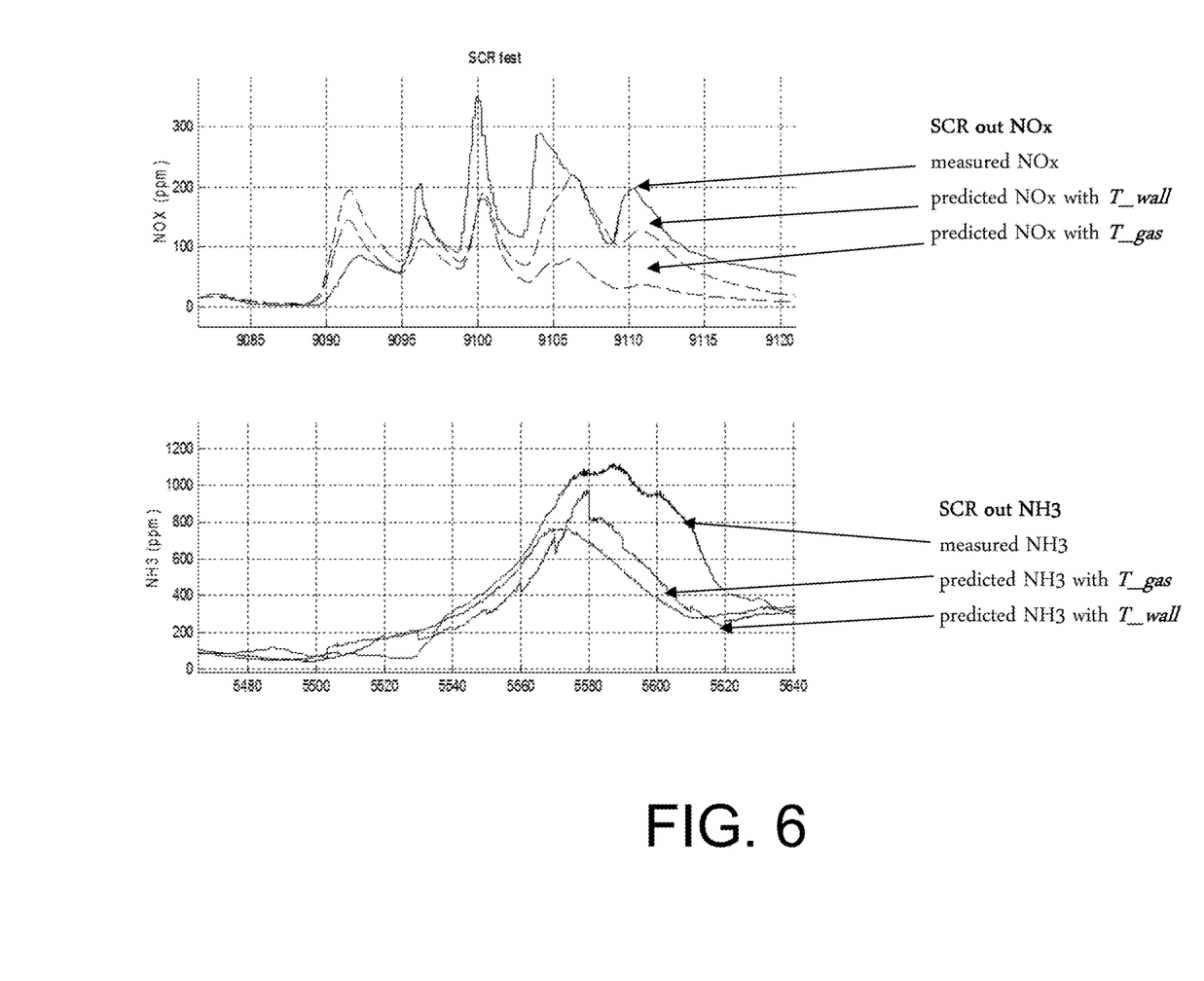
FIG. 6 illustrates example improvements in the NOx and NH3 predictions before and after using the temperature models according to one or more embodiments.

Coupling the SCR kinetics model with one of the washcoat temperature models above improves the accuracy of the SCR kinetics model, for example by more than 30%, in NOx prediction and also in NH3 prediction. FIG. 6 illustrates example improvements in the NOx and NH3 predictions before and after using the temperature models according to one or more embodiments. FIG. 6 further illustrates improvements provided by using T_wall 550 compared to using T_gas 540. It should be noted that the improvements shown in FIG. 6 are illustrative, and that in other examples, the improvements may be different, and or output may be different.

Figure 7:
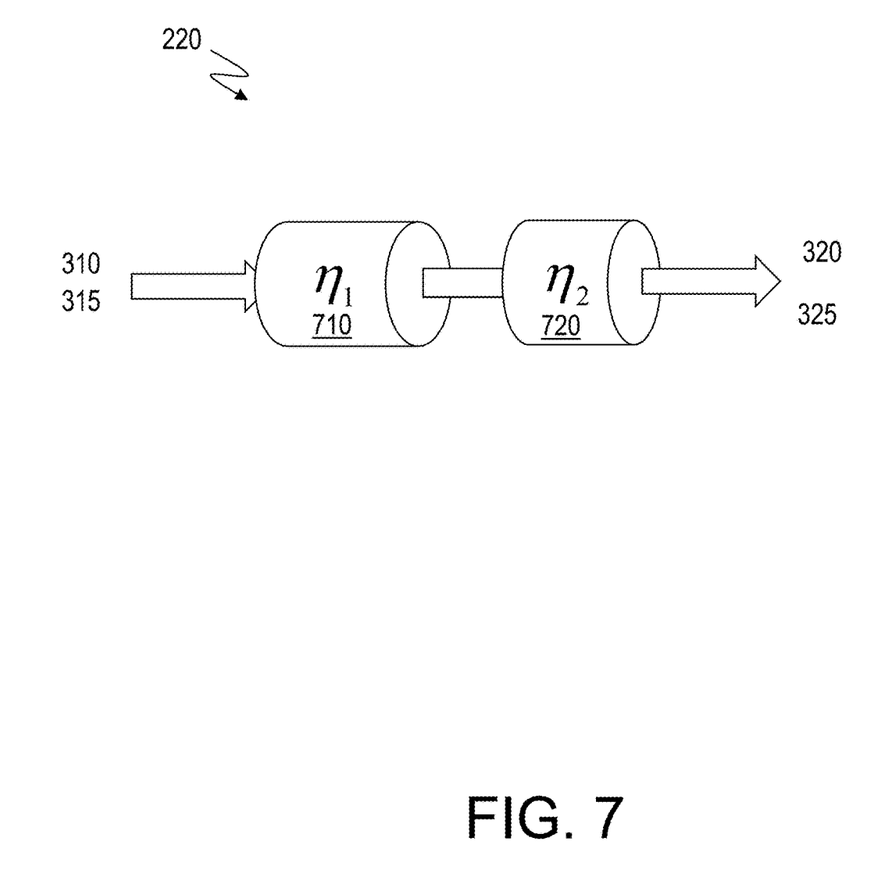
FIG. 7 illustrates a two-can SCR device, according to one or more embodiments.

The technical features described herein may further be used if the SCRF 220 includes more than one can (or stage) in which the SCR reaction occurs. For example, FIG. 7 illustrates a two-can SCRF 220. The two cans 710 and 720 may have different volume capacities, such as 60%-40% split, 70%-30% split, and the like. The cans may be arranged along the longitudinal axis of the substrate 224.

In one or more examples, the first can 710 removes NOx by selective catalytic reduction, and the second can oxidizes ammonia and hydrocarbons. Alternatively, or in addition, the SCRF 220 may include a third can (not shown) that oxidizes carbon monoxide and hydrocarbons, and the second can 720 only oxidizes the ammonia. Such separation facilitates for the oxidation of CO and HC, so that the third can is made accessible to the CO and HC to allow for lightoff and oxidation.

The NO2 in the incoming exhaust gas 216 has a faster reaction in the SCRF 220, within the first SCR can 710, compared to the other nitrogen oxides in the NOx and emissions in the exhaust gas 216. Typically, all of the $NO_2$ is reduced to $N_2$ and $H_2O$ in the first can 710. Therefore, separate $NO_2$ and NO equations in the first can 710, and the R-ratio correction is applicable only for the first can 710, because the second can 720 has only NO reaction, (i.e. the reaction in the second can 720 is not applied the R-ratio correction factor).

Accordingly, the control module 238 uses separate models for the first can 710 and the second can 720, such as

CAN-I =>

$$\begin{cases} 0 = (FC_{NO,in} - FC_{NO} - r_{RED-ST}C_{NO}\Theta\theta - 0.5 \cdot r_{RED-FAST}C_{NO}C_{NO2}\Theta\theta) \\ 0 = (FC_{NO_2,in} - FC_{NO_2} - 0.5 \cdot r_{RED-FAST}C_{NO}C_{NO2}\Theta\theta) \\ \dot{\theta} = r_{ADS}C_{NH_3}(1-\theta) - r_{DES}\theta - \\ \quad r_{RED-ST}C_{NO}\theta - r_{RED-FAST}C_{NO}C_{NO2}\theta - r_{OXY}\theta \\ 0 = (FC_{NH3,in} - FC_{NH3} - r_{ADS}\Theta C_{NH_3}(1-\theta) + r_{DES}\Theta\theta) \end{cases} ;$$

and $$CAN\text{-}II => \begin{cases} 0 = \frac{1}{V}(FC_{NOx,in} - FC_{NOx} - r_{RED}\Theta\theta C_{NOx}) \\ \dot{\theta} = r_{ADS}C_{NH_3}(1-\theta) - r_{DES}\theta - r_{RED}C_{NOx}\theta - r_{OXY}\theta \\ 0 = \frac{1}{V}(FC_{NH3,in} - FC_{NH3} - r_{ADS}\Theta C_{NH_3}(1-\theta) + r_{DES}\Theta\theta) \end{cases}$$

The R-ratio correction factor is only applied to the model for the first can 710, resulting in $$CAN\text{-}1_{R\text{-}Ratio} =>$$

$$\begin{cases} 0 = \frac{1}{V}(FC_{NOx,in} - FC_{NOx} - r_{RED}(T, R)\Theta\theta C_{NOx}) \\ \dot{\theta} = r_{ADS}C_{NH_3}(1-\theta) - r_{DES}\theta - r_{RED}(T, R)C_{NOx}\theta - r_{OXY}\theta \\ 0 = \frac{1}{V}(FC_{NH3,in} - FC_{NH3} - r_{ADS}\Theta C_{NH_3}(1-\theta) + r_{DES}\Theta\theta) \\ R = NO/NOx \end{cases}$$

The wall temperature model is applied to both, the first can 710 and the second can 720, to improve the accuracy of the estimates by the two-can model.

As an extension, in case of SCRF 220 with more than two cans, the R-ratio correction factor is applied only to the first can in the sequence, while the wall temperature model is used for all of the cans.

It should be noted that the kinetics model described herein is one example, and in other examples different kinetics model may be used for predicting the amount of $NO_x$, $NH_3$, and ammonia storage.

The technical features herein facilitate an emissions control system to compute estimated NOx and NH3 concentration values downstream from an SCR device using an SCR kinetics model. Further, the technical features herein improve the accuracy of the estimates by computing an R-ratio correction factor based on the ratio NO/NOx at the inlet of the SCR. The technical features further improve the accuracy of the estimate based on a wall temperature model of the SCR device. The computation of the estimates can also be performed faster because the technical features herein reduce the SCR kinetics model to a $1^{st}$ degree equation, thus improving the performance of a controller, such as an ECU. The controller can, therefore, control the SCR device at or nearly at real-time.

Further yet, the technical features herein facilitate the emissions control system to reduce ammonia slip. By facilitating a more efficient and accurate computation of the estimated NOx and NH3 concentrations downstream from the SCR device, the technical features enable the controller to provide appropriate amounts of the catalyst to reduce the ammonia slip.

The terms "about" and "substantially" are intended to include the degree of error associated with measurement of the particular quantity based upon the equipment available at the time of filing the application. For example, "about" can include a range of ±8% or 5%, or 2% of a given value.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for a motor vehicle including an internal combustion engine, the emissions control system comprising:
    a selective catalytic reduction (SCR) device fluidically including an SCR inlet and an SCR outlet; and
    a controller configured to:
        compute a correction factor for a kinetics model of the SCR device based on an amount of NO and an amount of NOx in the emissions control system, wherein the correction factor is a ratio of the amount of NO at the SCR inlet and the amount of NOx at the SCR inlet;
        predict an amount of NOx output by the SCR device using the kinetics model and the correction factor; and
        input an amount of catalyst into the SCR device based on the predicted amount of NOx.

2. The emissions control system of claim 1, wherein the controller is further configured to:
    predict the amount of NOx output based on a temperature of a wall of a substrate in the SCR device.

3. The emissions control system of claim 2, wherein the controller determines the temperature of the wall of the substrate based on a temperature of exhaust gas in the SCR device.

4. The emissions control system of claim 3, wherein the controller determines the temperature of the wall of the substrate based on a difference in a temperature at the SCR inlet and the temperature of the exhaust gas.

5. The emissions control system of claim 3, wherein the controller determines the temperature of the wall of the substrate based on a difference in a temperature at the SCR outlet and the temperature of the exhaust gas.

6. The emissions control system of claim 1, wherein the SCR device further comprises a first-can and a second-can, the kinetics model being a first kinetics model, and wherein the first-can operates according to the first kinetics model, and the second-can operates according to a second kinetics model, and only the first kinetics model is applied the correction factor.

7. An exhaust system for an internal combustion engine, configured to perform a selective catalytic reduction (SCR) of exhaust gas, the exhaust system comprising:
    a controller configured to:
        compute a correction factor for a kinetics model of an SCR device of the exhaust system, the correction factor computed based on an amount of NO and an amount of NOx in the exhaust gas, wherein the correction factor is a ratio of the amount of NO at an inlet of the SCR device and the amount of NOx at the inlet of the SCR device;
        predict an amount of NOx output of the SCR device using the kinetics model and the correction factor; and
        input an amount of catalyst into the SCR device based on the predicted amount of NOx.

8. The exhaust system of claim 7, wherein the controller is further configured to:
    predict the amount of NOx output based on a temperature of a wall of a SCR substrate of the SCR device.

9. The exhaust system of claim 8, wherein the controller determines the temperature of the wall of the SCR substrate based on a temperature of exhaust gas in the SCR device.

10. The exhaust system of claim 9, wherein the controller determines the temperature of the wall of the SCR substrate based on a difference in a temperature at the SCR inlet and the temperature of the exhaust gas.

11. The exhaust system of claim 9, wherein the controller determines the temperature of the wall of the SCR substrate based on a difference in a temperature at an SCR outlet and the temperature of the exhaust gas.

12. The exhaust system of claim 7, wherein the SCR device further comprises a first-can and a second-can, the kinetics model being a first kinetics model, and wherein the first-can operates according to the first kinetics model, and the second-can operates according to a second kinetics model, and only the first kinetics model is applied the correction factor.

13. An apparatus that controls a selective catalytic reduction (SCR) device of an exhaust system of an internal combustion engine, the apparatus comprising:
a controller configured to:
compute a correction factor for a kinetics model of the SCR device of the exhaust system, the correction factor computed as a ratio of an amount of NO in exhaust gas at an inlet of the SCR device and an amount of NOx in the exhaust gas at the inlet of the SCR device;
predict an amount of NOx output by the SCR device using the kinetics model and the correction factor; and
input an amount of catalyst into the SCR device based on the predicted amount of NOx.

14. The apparatus of claim 13, wherein the controller is further configured to:
predict the amount of NOx output based on a temperature of a wall of a SCR substrate of the SCR device.

15. The apparatus of claim 14, wherein the controller determines the temperature of the wall of the SCR substrate based on a difference in a temperature at the SCR inlet and the temperature of the exhaust gas.

16. The apparatus of claim 14, wherein the controller determines the temperature of the wall of the SCR substrate based on a difference in a temperature at an SCR outlet and the temperature of the exhaust gas.

17. The apparatus of claim 13, wherein the SCR device further comprises a first-can and a second-can, the kinetics model being a first kinetics model, and wherein the first-can operates according to the first kinetics model, and the second-can operates according to a second kinetics model, and only the first kinetics model is applied the correction factor.

* * * * *